United States Patent [19]
Sheridan

[11] Patent Number: 6,039,335
[45] Date of Patent: Mar. 21, 2000

[54] ADJUSTABLE CROSS-LOADING GO-CART CHASSIS

[75] Inventor: Brian M. H. Sheridan, West Bend, Wis.

[73] Assignee: Sheridan Racing Design, LLC, West Bend, Wis.

[21] Appl. No.: 09/223,572

[22] Filed: Dec. 30, 1998

[51] Int. Cl.⁷ ............................... B60G 7/00; B60P 7/00; B62D 7/00
[52] U.S. Cl. ........................... 280/124.103; 280/124.106; 280/86.751
[58] Field of Search ................ 280/124.103, 124.125, 280/89.12, 89.1, 124.106, 124.107, 86.75, 86.751, 86.757

[56] References Cited

U.S. PATENT DOCUMENTS

| | | | |
|---|---|---|---|
| 469,624 | 2/1892 | Bunker | 280/276 |
| 749,744 | 1/1904 | Packard | 280/124.107 |
| 2,045,028 | 6/1936 | Sellman | 280/124.177 |
| 2,256,366 | 9/1941 | Weston | 280/124.103 |
| 2,643,897 | 6/1953 | Chowning | 280/124.107 |
| 3,022,846 | 2/1962 | Thompson . | |
| 3,557,894 | 1/1971 | Hanley . | |
| 3,799,283 | 3/1974 | Freber . | |
| 4,407,383 | 10/1983 | Enokimoto et al. | 180/291 |
| 4,504,079 | 3/1985 | Strong | 280/124.106 |
| 4,606,429 | 8/1986 | Kurata . | |
| 4,629,023 | 12/1986 | Carpanelli et al. . | |
| 4,682,668 | 7/1987 | Salmon et al. . | |
| 4,896,899 | 1/1990 | Lawrence . | |
| 5,265,690 | 11/1993 | Amundsen et al. . | |
| 5,542,705 | 8/1996 | Parker et al. | 280/124.103 |
| 5,732,969 | 3/1998 | Spoto | 280/124.107 |

*Primary Examiner*—Paul N. Dickson
*Assistant Examiner*—Michael Britton
*Attorney, Agent, or Firm*—Andrus, Sceales, Starke & Sawall

[57] ABSTRACT

A go-cart having a chassis including a support frame, a first wheel assembly and a second wheel assembly. Each of the first and second wheel assemblies is mounted to the support frame such that the wheel assembly can pivot about its connection to the support frame. A first load transfer member is connected between the first wheel assembly and a second side member of the support frame, while a second load transfer member is connected between the second wheel assembly and the first side member of the support frame. During cornering, an upward load force applied to the outside, first wheel assembly is transferred through the first load transfer member to urge the second side member of the support frame downward relative to the first side member. At the same time, the upward load force is transferred from the first side member to the second wheel assembly to pivot the second wheel assembly downward. The combination of the load transfer members transfers the load force from the outside wheel to the inside wheel to increase the traction and stability between the inside wheel and the racing surface.

21 Claims, 3 Drawing Sheets

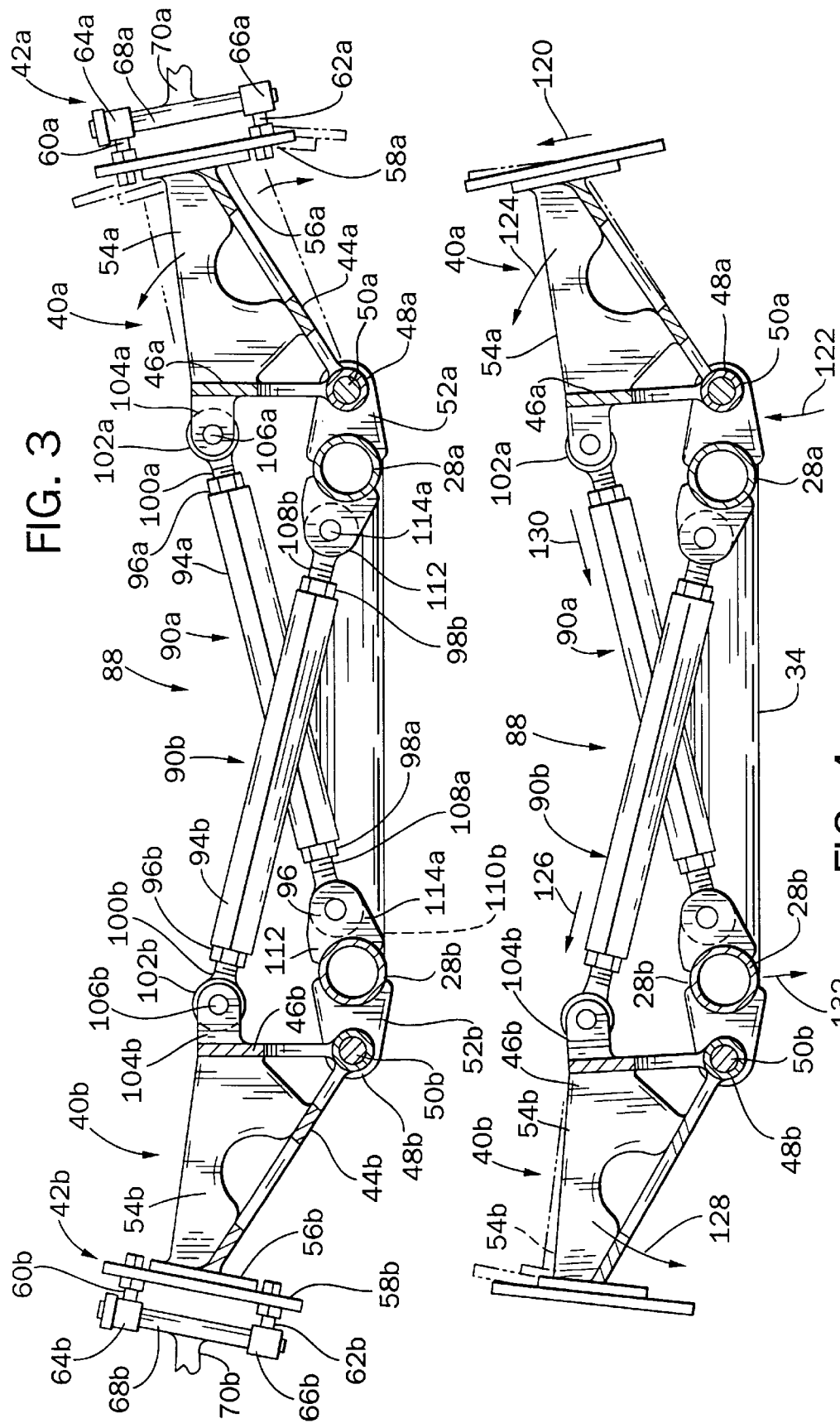

ADJUSTABLE CROSS-LOADING GO-CART CHASSIS

BACKGROUND OF THE INVENTION

The present invention relates to a go-cart chassis, and more particularly to a go-cart chassis having a resilient support frame and a front wheel mounting and support arrangement that combine to increase the traction of the front wheels during cornering.

Racing go-carts typically include a one-piece support frame having a rear section and a front section. The front wheels and steering mechanism are mounted to the front section, and the rear wheels, the engine and the transmission are mounted to the rear section. The seat is mounted to the rear section forwardly of the transmission and rear wheels, and is located such that the weight of the driver is distributed evenly to the front wheels and the rear wheels.

In order to meet guidelines established by the recognized governing body of go-cart racing, go-carts do not have a suspension interconnected either between the front portion of the frame and the front wheels, or between the rear portion of the frame and the rear wheels. This reduces the cost of the go-cart, but also significantly limits the speed at which the go-cart can take corners, since the driver must slow the go-cart significantly at corners to maintain sufficient traction to prevent loss of control.

It is an object of the present invention to provide a racing go-cart chassis having a front wheel mounting arrangement which is operable to increase the traction and stability of the front wheels without the use of a suspension system. It is a further object of the invention to provide such a front wheel mounting arrangement which is adapted for use in combination with a flexible frame and which utilizes the flexibility of the frame to increase wheel traction. A still further object of the invention is to provide such a front wheel mounting arrangement incorporating adjustability for varying operating conditions. A still further object of the invention is to provide such a wheel mounting arrangement which is relatively simple in its components and construction, and which does not add appreciably to the overall cost of the go-cart.

SUMMARY OF THE INVENTION

The present invention relates to a go-cart chassis which includes a wheel mounting system operable to increase traction and increase stability of the wheels during cornering. The chassis includes a support frame having first and second side frame members. The support frame is sufficiently rigid to support the various components attached to the support frame, as well as the weight of the driver, and is flexible about a longitudinal front-rear axis such that the first and second side members are capable of translating vertically relative to each other when subjected to an upward or downward force.

A first wheel mounting assembly is interconnected with the first side frame member and one of the wheels, and a second wheel mounting assembly is interconnected between the second side frame member and the other one of the wheels. The wheel mounting assemblies are substantially mirror images of each other. Each wheel mounting assembly includes a pivot plate that is pivotably connected to the respective side frame member of the support frame. In a preferred form, each pivot plate is pivotally mounted to one of the side frame members for pivoting movement about a pivot axis substantially parallel to a longitudinal axis defined by the side frame member, which in turn is parallel to the longitudinal axis of the chassis. In this manner, the wheels are capable of vertical oscillating movement relative to the support frame.

A first force-transferring member is connected between the first wheel assembly and the second side frame member of the support frame, and a second force-transferring member is connected between the second wheel assembly and the first side frame member of the support frame. Each force-transferring member is interconnected with the respective wheel mounting assembly at a location offset from the pivot axis defined by the wheel mounting assembly. Preferably, the first and second force-transferring members are each in the form of a rigid cross-link which is adjustable in length. The cross-links are operable to restrict the pivoting movement of each wheel assembly relative to the support frame.

During cornering of the go-cart, the centrifugal forces experienced by the driver and the go-cart function to force the outside front wheel downwardly against the surface and create a tendency to lift the inside front wheel off the surface. This results in an upward force applied to the outside wheel, which is transferred to the outside side frame member and to the pivot plate of the wheel mounting assembly for the outside wheel which, for example, may be the first wheel mounting assembly. This causes pivoting movement of the pivot plate of the first wheel mounting assembly, which is resisted by the first force-transferring member interconnected between the first (outside) wheel mounting assembly and the second (inside) side frame member of the support frame. An axial force is thus generated in the first force-transferring member, which results in a downward force on the second (inside) side frame member. The flexibility of the support frame enables the support frame to twist about its longitudinal axis due to the downward force exerted on the second (inside) side frame member and the upward force exerted on the first (outside) side frame member. This twisting of the support frame translates the second (inside) side frame member vertically downwardly relative to the first (outside) side frame member, to move the inside front wheel downwardly toward the surface.

Simultaneously, the upward force exerted on the first (outside) side frame member exerts an axial force on the second force-transferring member, which is connected between the first (outside) side frame member and the second (inside) wheel mounting assembly. The axial force on the second force-transferring member is applied to the second (inside) wheel mounting assembly at a location offset from the pivot axis of the pivot plate forming a part of the second wheel mounting assembly, which is operable to rotate the pivot plate of the second wheel assembly downwardly about its pivot axis. This action forces the inside wheel, which is mounted to the second (inside) wheel mounting assembly, downwardly toward the surface.

The simultaneous twisting of the support frame about its longitudinal axis and downward pivoting movement of the inside wheel mounting assembly about its pivot axis, is operable to force the inside wheel toward the surface to increase the traction of the inside wheel and to provide a significant increase in steering control when cornering.

Various other features, objects and advantages of the invention will be made apparent from the following detailed description taken together with the drawings.

BRIEF DESCRIPTION OF THE DRAWINGS

The drawings illustrate the best mode presently contemplated of carrying out the invention.

In the drawings:

FIG. 3 is a front elevation view, partially in section, showing the wheel mounting arrangement and front support frame section of the go-cart of FIG. 1, showing movement of one of the wheel mounting assemblies relative to the support frame; and FIG. 4 is a view similar to FIG. 3, showing transfer of forces from one wheel mounting assembly to the other during cornering.

DETAILED DESCRIPTION OF THE INVENTION

Figure 1:
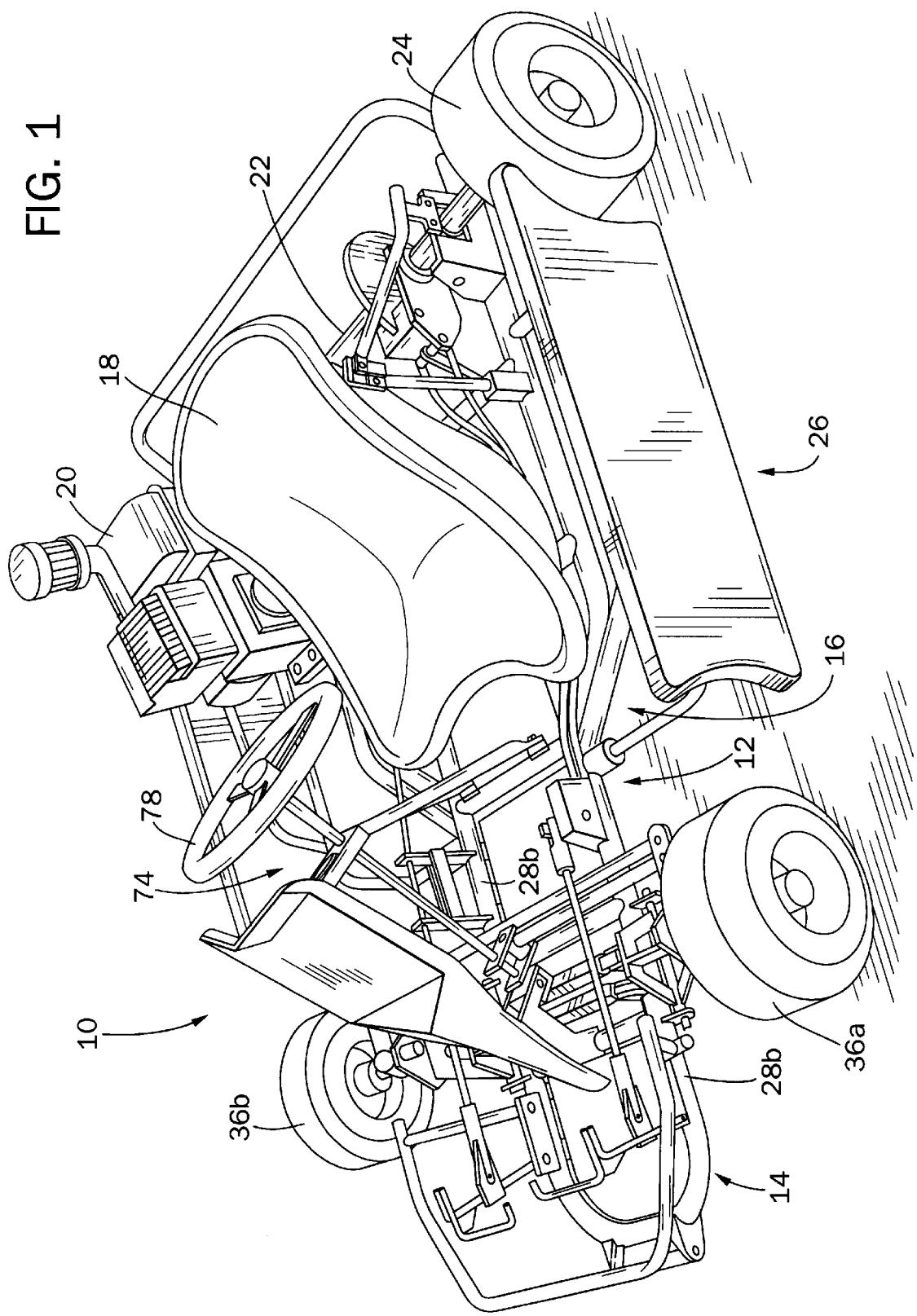
FIG. 1 is an isometric view of a racing go-cart incorporating the chassis and wheel mounting arrangement of the present invention.

FIG. 1 illustrates a racing go-cart 10 incorporating the features of the present invention. Go-cart 10 has a chassis 12, which includes a frame consisting of a front frame section 14 and a rear frame section 16. A seat 18 and an engine 20 are mounted to rear frame section 16. A rear axle 22 is rotatably supported by rear frame section 16, and a pair of rear wheels, one of which is shown at 24, are mounted to the ends of rear axle 22. A suitable transmission (not shown) is interconnected between the output of engine 20 and rear axle 22, for driving rear wheels 24 in response to operation of engine 20 in a manner as is known.

Chassis 12 further includes a pair of outer protective side frame assemblies 26 which protect the driver and define the lateral outer extent of chassis 12.

Figure 2:
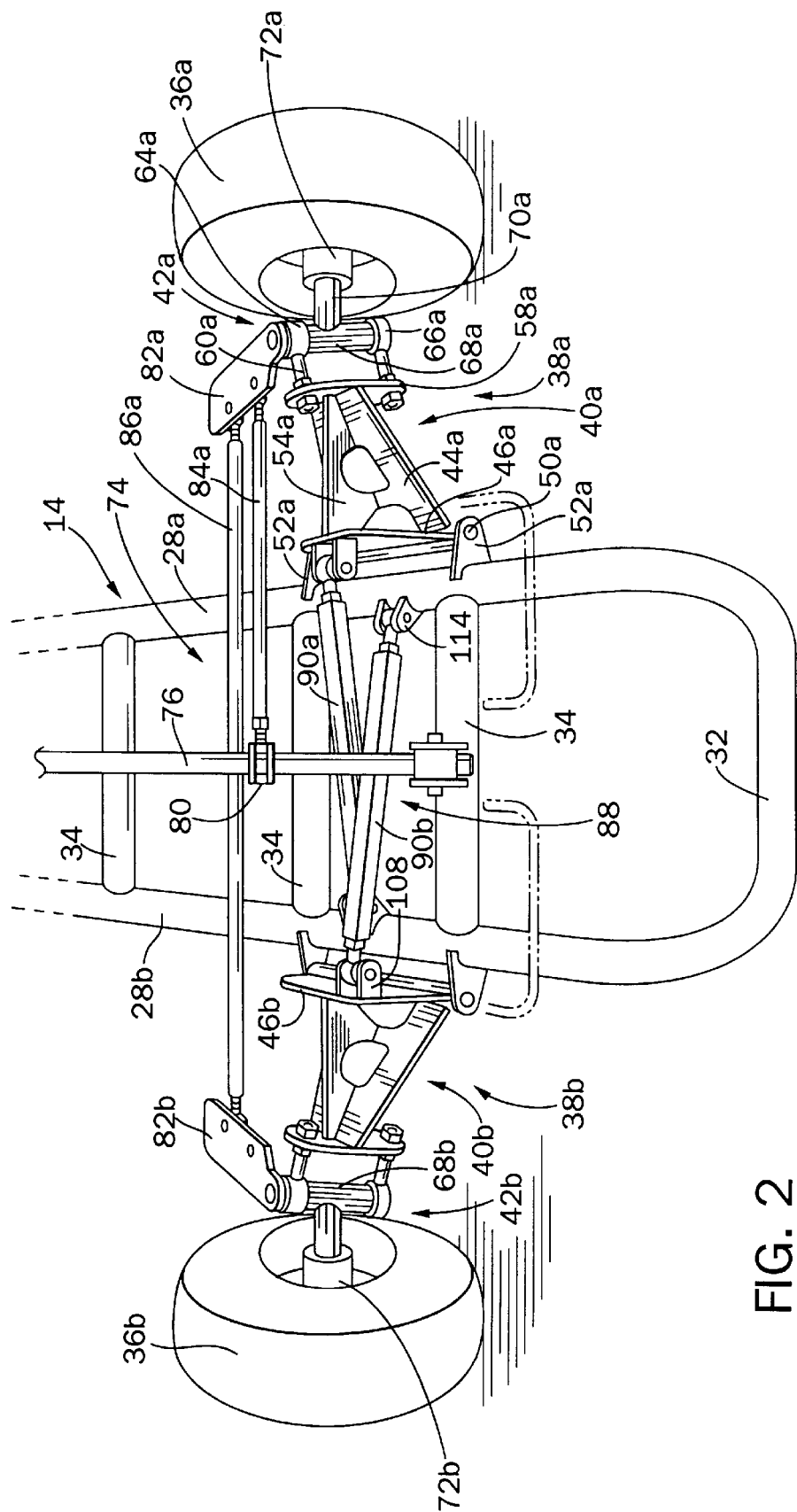
FIG. 2 is a partial front isometric view illustrating the wheel mounting arrangement and the front section of the support frame of the go-cart of FIG. 1.

Referring to FIG. 2, front frame section 14 includes first and second parallel side frame members 28a and 28b, which are interconnected at their forward ends by a front end member 32. Side frame members 28 and 28b each extend along a longitudinal axis which is parallel to the longitudinal front-rear axis of go-cart 10. A series of spaced cross-members 34 are interconnected between first and second side frame members 28 and 30 in any satisfactory manner, such as by welding, to rigidly interconnect side frame members 28a and 28b and to form a ladder-type construction of front frame section 14. As can be seen in FIG. 1, first and second side members 28a and 28b extend rearwardly from front frame section 14, and seat 18 is mounted to the rearward portions of first and second side frame members 28a, 28b to support the weight of the driver thereon.

First and second side frame members 28, 28b, respectively, may be formed of any satisfactory material, such as aluminum or steel tubing. Front frame section 14, as defined by side frame members 28a, 28b, front end member 32 and cross-members 34, is flexible and capable of twisting about its longitudinal axis, such that side frame members 28a and 28b can translate vertically with respect to each other.

A pair of front wheels 36a, 36b are mounted to side frame members 28a, 28b, respectively, via wheel mounting assemblies 38a, 38b, respectively. Wheels 36a, 36b and wheel mounting assemblies 38a, 38b may be mirror images of each other, and wheel 36a and wheel mounting assembly 38a will be described in detail, with the understanding that wheel 36b and wheel mounting assembly 38b contain substantially identical components which will be referred to hereafter with the same reference number, but with the designation "b" instead of "a".

Wheel mounting assembly 38a generally includes a pivot member 40a pivotably interconnected with side frame member 28a and a wheel mounting bracket assembly 42a interposed between wheel 36a and the outer end of pivot member 40a. Referring to FIGS. 2 and 3, pivot member 40a includes a base plate 44a and an upright pivot plate 46a, each of which extends outwardly from a pivot tube 48a. Pivot tube 48a defines an internal passage within which a pivot shaft 50a is received. Pivot shaft 50a is mounted at its ends to a pair of mounting tabs 52a which are secured to and extend outwardly from side frame member 28a. Pivot shaft 50a extends along a longitudinal axis parallel to the longitudinal axis of side frame member 28a and front frame section 14, and defines a pivot axis about which pivot member 40a is pivotable.

Base plate 44a and pivot plate 46a of pivot member 40a are oriented at an acute angle relative to each other, and an upright reinforcing gusset plate 54a is mounted to base plate 44a and pivot plate 46a for providing rigidity to pivot member 40a. Openings are formed in base plate 44a, pivot plate 46a and gusset plate 54a, to reduce the overall weight of pivot member 40a and to decrease the air resistance of pivot member 40a. An end plate 56a is mounted to the outer end of pivot member 40a, and a camber plate 58a is mounted to end plate 56a.

Wheel mounting bracket assembly 42a includes an upper support pin 60a mounted to and extending outwardly from the upper portion of camber plate 58a above its connection to pivot member 40a, and a lower support pin 62a mounted to and extending outwardly from the lower portion of camber plate 58a below its connection to pivot member 40a. An upper collar 64a is mounted to the outer end of upper support pin 60a, and a lower collar 66a is mounted to the outer end of lower support pin 62a. A vertical steering shaft 68a is pivotably mounted to and extends between upper and lower collars 64a, 66a, respectively, and an axle 70a is mounted to steering shaft 68a, extending outwardly therefrom between upper and lower collars 64a, 66a, respectively. Wheel 36a includes a hub 72a, which is rotatably supported on axle 70a.

A steering assembly, shown generally at 74, is interconnected between front frame section 14 and steering shaft 68a and 68b of wheel mounting bracket assemblies 42a and 42b, respectively. Steering assembly 74 includes a steering rod 76 having a steering wheel 78 (FIG. 1) mounted to its upper end. The lower end of steering rod 76 is rotatably mounted to front cross-member 34, and a collar 80 is secured to steering rod 76 toward its lower end. A pair of steering plates 82a, 82b are fixed to the upper ends of steering shafts 68a, 68b, respectively, and a steering actuator rod 84a extends between collar 80 and steering plate 82a. A tie rod 86 extends between and interconnects steering plates 82a, 82b. Steering plates 82a, 82b, in combination with actuator rod 84 and tie rod 86, make up a steering linkage which is operable to impart pivoting movement to steering shafts 68a, 68b in response to rotation of steering rod 76 caused by rotation of steering wheel 78, to thereby alter the orientation of wheels 36a, 36b relative to front frame section 14, while maintaining wheels 36a and 36b parallel to each other, to steer go-cart 10.

A force-transferring arrangement, shown generally at 88, is interconnected with front frame section 14 and pivot members 40a and 40b for increasing the traction of wheels 36a and 36b during cornering. Force-transferring arrangement 88 includes a rigid cross-member 90a which extends between side frame member 28b and pivot member 40a, and a rigid cross-member 90b which extends between side frame member 28a and pivot member 40b.

Cross-member 90a is in the form of a tubular member 94a having a threaded nut 96a rigidly mounted to its upper end and a threaded nut 98a rigidly mounted to its lower end. A threaded rod 100*a* is engaged with nut 96*a*, and is mounted at its outer end to a collar 102*a* which is interposed between a pair of ears 104*a* mounted to and extending inwardly from the upper end of pivot plate 46*a*. Collar 102*a* defines a passage within which a pivot pin 106*a* is received. Pivot pin 106*a* is mounted at its ends to ears 104*a*, and defines a pivot axis parallel to the pivot axis defined by pivot shaft 50*a*.

A threaded rod 108*a* is engaged with the threads of nut 98*a* at the lower end of cross-member 90*a*, and a collar 110*a* is mounted to the outer end of rod 108*a*. Collar 110*a* is received between a pair of mounting ears 112 secured to and extending inwardly from side frame member 28*b*. Collar 110*a* defines a passage within which a pivot pin 114*a* is received. Pivot pin 114*a* is mounted at its ends to ears 112, and defines a pivot axis substantially parallel to the pivot axis defined by pivot pin 106, and is thus parallel to the longitudinal axis of side frame member 28*b*.

Nuts 96*a* and 98*a* are threaded in opposite directions, as are threaded rods 100*a*, 108*a*. Tubular member 94*a* is irregular in cross-section, which allows the user to engage tubular member 94*a* with a wrench or the like so as to turn tubular member 94*a* and nuts 96*a*, 98*a* relative to rods 100*a*, 108*a*. Such turning of tubular member 94*a* and nuts 96*a*, 98*a* results in an alteration of the overall length of cross-member 90*a*, for reasons to be explained.

Cross-member 90*b*, which extends between side frame member 28*a* and pivot member 40*b*, is identical in construction to cross-member 90*a*, and is mounted to side frame member 28*a* and pivot member 40*b* in the same manner as cross-member 90*a* is mounted to side frame member 28*b* and pivot member 40*a*, respectively. Like reference characters are used to designate the components of cross-member 90*b* as are used in connection with cross-member 90*a*, again modified to designate each component "b" instead of "a".

With this construction, cross-member 90*a* functions to tie pivot member 40*a* to side frame member 28*b*, such that support for the upper end of pivot plate 46*a* is provided by cross-member 28*b*. Similarly, cross-member 90*b* functions to tie pivot member 40*a* to side frame member 28*a*, to support the upper end of pivot member 40*b* by connection to side frame member 28*a*. Cross-members 90*a* and 90*b* function as link members under compression between pivot members 40*a*, 40*b*, respectively, and side frame member 28*b*, 28*a*, respectively, due to the normal upward forces exerted on wheels 36*a*, 36*b*.

In operation, force-transferring arrangement 88 functions as follows to increase the traction of wheels 36*a* and 36*b*, to enhance the control of go-cart 10. In normal straight operation when go-cart 10 is not cornering, cross-member 90*a* simply cooperates with the pivoting connection of pivot member 40*a* to pivot shaft 50*a* to provide support for wheel 36*a* through pivot member 40*a* and wheel mounting bracket assembly 42*a*. Similarly, cross-member 90*b* cooperates with the pivoting connection of pivot member 40*b* to pivot shaft 50*b* to support wheel 36*b* through pivot member 40*b* and wheel mounting bracket assembly 42*b*. When go-cart 10 is steered about a corner in which wheel 36*a* is the inside wheel and wheel 36*b* is the outside wheel, a transfer of forces as shown in FIG. 4 occurs in order to enhance the traction available to wheel 36*b* and to increase the control of go-cart 10 during steering. When cornering in this manner, wheel 36*a*, which is the inside wheel, experiences an upward force which tends to move wheel 36*a* upwardly as indicated by arrow 120 in FIG. 4. This upward force exerted on wheel 36*a* is transferred to pivot member 40*a*, and exerts an upward force as indicated at arrow 122 on side frame member 28*a*. At the same time, the upward force exerted on inside wheel 36*a* tends to cause counterclockwise rotation of pivot member 40*a* about the pivot axis defined by pivot shaft 50*a*, as shown at arrow 124.

The upward force exerted on side frame member 28*a* exerts an axial force, as indicated at arrow 126, in cross-member 90*b*, due to the pivoting connection of cross-member 90*b* to side frame member 28*a*. The axial force experienced by cross-member 90*b* is then applied to the pivot connection between cross-member 90*b* and pivot member 40*b*, which exerts an axial upward force and an axial outward force on pivot member 40*b* at pivot pin 106*b*. These forces both tend to rotate pivot member 40*b* in a counterclockwise direction about pivot shaft 50*b*, which functions to force wheel 36*b* downwardly toward the ground or other surface, as shown at arrow 128. Simultaneously, the tendency of pivot member 40*a* to rotate about pivot shaft 50*a* exerts an axial force in cross-member 90*a*, as shown at arrow 130, through the pivot connection of cross-member 90*a* to pivot member 40*a*. This axial force in cross-member 90*a* is applied to the pivot connection of cross-member 90*a* to side frame member 28*b*, including a lateral outward force and a vertical downward force. The lateral outward force is resisted by frame cross-members 34, and the lateral downward force on side frame member 28*b*, shown at arrow 132, in combination with the upward force exerted on side frame member 28*a*, functions to twist front frame section 14 in a counterclockwise direction about its longitudinal axis, to force side frame member 28*b* downwardly.

As can be appreciated, the dual action of simultaneously twisting front frame section 14 while rotating pivot member 40*b* outwardly and downwardly functions to urge outside wheel 36*b* toward the surface, to increase the traction of outside wheel 36*b* and to provide significantly enhanced control of go-cart 10 when steering around a corner, thus enabling the driver to increase cornering speed.

As can readily be appreciated, cross-members 90*a* and 90*b* function in a reverse manner to force wheel 36*a* downwardly when go-cart 10 is cornering such that wheel 36*b* is the inside wheel and wheel 36*a* is the outside wheel.

The adjustability in the overall length of cross-members 90*a* and 90*b* can be exploited to accommodate variations in track conditions and layout. For example, when racing an oval course, go-cart 10 always corners in the same direction, and the length of one of cross-members 90*a* can be shortened and the other lengthened to provide a pre-bias of the outside wheel downwardly. Adjustments can also be used to accommodate variations in distribution of weight across the width of go-cart 10.

The invention has been shown in an arrangement in which wheel mounting assemblies 38*a* and 38*b* are substantially identical in construction and mirror images of each other. It should be understood, however, that the wheel mounting assemblies may vary from one side of go-cart 10 to the other, which may be the case when go-cart 10 is to be operated on a track, such as an oval, in which one side is always on the inside and the other side is always on the outside when cornering.

It can thus be appreciated that the invention provides a unique and simple wheel mounting arrangement for a go-cart in order to enhance the traction and control of the go-cart during cornering. The invention utilizes a small number of components and a unique interrelation of the components in order to provide significant advantages in operation.

Various alternatives, modifications and embodiments are contemplated as being within the scope of the following claims particularly pointing out and distinctly claiming the subject matter regarded as the invention.

I claim:

1. A wheel mounting system for a vehicle having a frame including a pair of spaced side members extending in a front-rear direction, comprising
   a wheel mounting member pivotably mounted to each frame side member for pivoting movement about a front-rear pivot axis; and
   a support member interconnected between each wheel mounting member and the frame side member opposite the frame side member to which the wheel mounting member is pivotably mounted, wherein the support members are oriented so as to extend transversely relative to the frame, and wherein each support member defines a first end interconnected with one of the wheel mounting members at a location spaced above the frame side member to which the wheel mounting member is mounted and defines a second end located at an elevation below the first end and interconnected at the second end with the other one of the frame side members.

2. The wheel mounting system of claim 1, wherein the front-rear pivot axis about which each wheel mounting member is pivotably mounted to one of the side frame members is oriented substantially parallel to a longitudinal axis along which the frame side member extends, such that the mounting member pivot axes and the frame side member longitudinal axes are parallel to each other.

3. The wheel mounting system of claim 2, wherein each front-rear pivot axis is defined by a pivot shaft mounted between a pair of mounting tabs extending transversely outwardly from one of the frame side members.

4. The wheel mounting system of claim 1, wherein each support member is adjustable in length so as to vary the spacing between the first and second ends of the support member.

5. The wheel mounting system of claim 4, wherein each support member comprises a rigid axially extending body, and wherein each end of the support member is defined by an end member which is adjustable inwardly and outwardly relative to the body along the axis of the body.

6. A go-cart chassis incorporating the wheel mounting system of claim 1, wherein the frame includes a rear section adapted to mount an engine and a seat for a driver, and wherein the pair of spaced side members extend forwardly from the rear section for mounting a pair of front wheels thereto, wherein The pair of spaced side members are vertically displaceable relative to each other in response to twisting forces exerted on the frame during cornering.

7. A wheel mounting arrangement for a vehicle having a frame in which first and second side portions of the frame extending in a front-rear direction are vertically displaceable relative to each other, comprising:
   a pair of pivotable wheel mounting members, each of which is interconnected with one of the frame side portions for pivoting movement about a front-rear pivot axis; and
   a pair of force-transferring members, wherein a first one of the force-transferring members is interconnected between a first one of the wheel mounting members and the second frame side portion, to which a second one of the wheel mounting members is pivotably mounted, and wherein a second one of the force-transferring members is interconnected between the second wheel mounting member and the first franc side portion, to which the first wheel mounting member is pivotably mounted;
   wherein the force-transferring members are oriented transverse to the first and second frame side portions and extend downwardly from the first and second wheel mounting members to the second and first frame side portions, respectively, and are operable to exert downward forces on the first and second frame side portions in response to upward forces on the second and first wheel mounting members, respectively.

8. The wheel mounting arrangement of claim 7, wherein the first force-transferring member is pivotably mounted to the first wheel mounting member at a location spaced above the first frame side portion and extends downwardly between the frame side portions for connection to the second frame side portion, and wherein the second force-transferring member is pivotably interconnnected with the second wheel mounting member at a location above the second frame side portion and extends downwardly between the frame side portions for connection to the first frame side portion.

9. The wheel mounting arrangement of claim 8, wherein the first and second force-transferring members are pivotably interconnected with the second and first frame side portions, respectively, for pivoting movement about a front-rear pivot axis.

10. The wheel mounting arrangement of clam 9, wherein each force-transferring member is adjustable in length so as to adjust the downward forces exerted on the first and second frame side portions.

11. The wheel mounting arrangement of claim 9, wherein each force-transferring member is pivotably mounted to its respective frame side portion by means of first mounting structure extending inwardly from the frame side portion, and wherein each wheel mounting member is pivotably interconnected with its respective frame side portion via second mounting structure extending outwardly from the frame side portion.

12. The wheel mounting arrangement of claim 9, wherein each wheel mounting member includes wheel mounting structure located outwardly of the pivot axis for mounting a wheel thereto, and includes mounting structure for one of the force-transferring members located vertically above the pivot axis and the frame side portion to which the wheel mounting member is mounted.

13. A wheel mounting arrangement for a wheeled vehicle, comprising:
   a frame assembly including first and second spaced apart axially extending side frame members which are vertically movable relative to each other;
   first and second wheel mounting members for mounting a wheel to the first and second side frame members, respectively, wherein each wheel mounting member is mounted to one of the side frame members via a pivot connection providing pivoting movement about a pivot axis substantially parallel to the longitudinal axis of the side frame member, and wherein each wheel mounting member includes a first portion which extends upwardly relative to the pivot axis to a location above the side frame member, and a second portion which extends outwardly relative to the pivot axis and to which one of the wheels is mounted; and
   a pair of force-transferring members, wherein a first one of the force-transferring members is pivotably interconnected at one end with the first, upwardly extending portion of the first wheel mounting member and is pivotably interconnected at an opposite end with the second side frame member, wherein the first force-transferring member is oriented so as to extend transversely relative to the frame assembly and downwardly from the first wheel mounting member to the second side frame member, and wherein a second one of the force-transferring members is pivotably interconnected at one end with the first, upwardly extending portion of the second wheel mounting member and is pivotably interconnected at an opposite end with the first side frame member, wherein the second force-transferring member is oriented so as to extend transversely relative to the frame assembly and downwardly from the second wheel mounting member to the first side frame member;

wherein an upward force on the wheel mounted to the first side frame member causes upward pivoting movement of the first wheel mounting member about the pivot connection to apply a compressive force to the force-transferring member interconnected with the first wheel mounting member and thereby a downward force on the second side frame member, resulting in vertical downward displacement of the second side frame member relative to the first side frame member to apply a downward force to the wheel mounted to the second side frame member through the second wheel mounting member, and wherein an upward force on the wheel mounted to the second side frame member causes upward pivoting movement of the second wheel mounting member about the pivot connection to apply a compressive force to the force transferring member interconnected with the second wheel mounting member and thereby a downward force on the first side frame member, resulting in vertical downward displacement or the first side frame member relative to the second side frame member to apply a downward force to the wheel mounted to the first side frame member through the first wheel mounting member.

14. The wheel mounting arrangement of claim 13, wherein each force-transferring member is adjustable in length so as to adjust the downward forces exerted on the first and second side frame members.

15. The wheel mounting arrangement of claim 13, wherein each force-transferring member is pivotably interconnected with one of the side frame members by means of first mounting structure extending inwardly from the side frame member toward the other side frame member, and wherein each wheel mounting member is mounted to one of the side frame members by means of second mounting structure extending outwardly from the side frame member.

16. The wheel mounting arrangement of claim 13, wherein the frame assembly comprises a go-cart frame including a rear section adapted to mount an engine and a seat for a driver, and wherein the first and second side frame members comprise, a forward section of the go-cart frame extending forwardly therefrom for mounting a pair of front wheels thereto.

17. The wheel mounting arrangement of claim 16, wherein the seat of the go-cart frame is located in line with the first and second side frame members.

18. A method of increasing traction in a wheeled vehicle during cornering, wherein the vehicle includes a frame having a first side member and a second side member which are vertically displaceable relative to each other, comprising the steps of:

pivotably mounting a first wheel assembly to the fiat frame side member;

pivotably mounting a second wheel assembly to the second frame side member;

coupling the first wheel assembly to the second frame side member with a first force-transferring member extending transversely to the frame and downwardly from the first wheel assembly to the second frame side member;

coupling the second wheel assembly to the first frame side member with a second force-transferring member extending transversely to the frame and downwardly from the second wheel assembly to the first frame side member;

wherein the wheel assemblies and the force-transferring members are operable during cornering to transfer an upward force on one of the first and second wheel assemblies into a downward force on one of the second and first frame side members, respectively, so as to cause a vertical downward displacement thereof to increase traction of the wheel assembly mounted thereto.

19. The method of claim 18, wherein the step of pivotably mounting the first and second wheel assemblies to the first and second frame side members, respectively, is carried out such that the first and second wheel assemblies are each pivotable about a pivot axis extending substantially parallel to a longitudinal axis of the first and second frame side members, respectively.

20. The method of claim 19, wherein the step of coupling the first wheel assembly to the second frame side member is carried out by pivotably mounting one end of the first force-transferring member to the second frame side member and pivotably mounting an opposite end of thc first force-transferring member with the first wheel assembly at a location spaced above the first side the member and above the pivotable mounting of the first wheel assembly to the first frame side member, and wherein the step of coupling the second wheel assembly to the first frame side member is carried out by pivotably mounting one end of the second force-transferring member with the first frame side member and pivotably mounting an opposite end of the second force-transferring member to the second wheel assembly at a location spaced above the second frame side member and above the pivotable mounting of the second wheel assembly to th second frame side member.

21. The method of claim 20, wherein the steps of coupling the first and second wheel assemblies to the second and first frame side members, respectively, are carried out by interconnecting and second adjustable length force-transferring members between the first and second wheel assemblies and the second and first frame side members, respectively.

* * * * *

UNITED STATES PATENT AND TRADEMARK OFFICE
CERTIFICATE OF CORRECTION

PATENT NO: 6,039,335

DATED: March 21, 2000

INVENTORS: BRIAN M.H. SHERIDAN

It is certified that error appears in the above-identified patent and that said Letters Patent is hereby corrected as shown below:

Claim 1, column 7, line 6, after "comprising" insert -- : --; Claim 1, column 7, line 18, after "mounted" insert -- , --; Claim 6, column 7, line 47, delete "The" and substitute therefor -- the --; Claim 7, column 7, line 65, delete "franc" and substitute therefor -- frame --; Claim 13, column 9, line 32, delete "or" and substitute therefor -- of --; Claim 16, column 9, line 52, after "comprise" delete ","; Claim 18, column 10, line 4, delete "fiat" and substitute therefor -- first --; Claim 20, column 10, line 41, delete "the" (second occurrence) and substitute therefor -- frame --; Claim 20, column 10, line 51, delete "th" and substitute therefor -- the --; Claim 21, column 10, line 55, after "connecting" insert -- first --.

Signed and Sealed this

Sixth Day of February, 2001

*Attest:*

Q. TODD DICKINSON

*Attesting Officer*  *Director of Patents and Trademarks*